(12) United States Patent
Dharmasena et al.

(10) Patent No.: US 11,881,793 B2
(45) Date of Patent: Jan. 23, 2024

(54) TRIBOELECTRIC GENERATOR (71) Applicant: University of Surrey, Guildford (GB)

(72) Inventors: Ishara Dharmasena, Guildford (GB); Sembukuttiarachilage Ravi Pradip Silva, Guildford (GB)

(73) Assignee: University of Surrey, Guildford (GB)

( * ) Notice: Subject to any disclaimer, the term of this patent is extended or adjusted under 35 U.S.C. 154(b) by 0 days.

(21) Appl. No.: 17/296,483

(22) PCT Filed: Nov. 27, 2019

(86) PCT No.: PCT/GB2019/053344
§ 371 (c)(1),
(2) Date: May 24, 2021

(87) PCT Pub. No.: WO2020/109783
PCT Pub. Date: Jun. 4, 2020

(65) Prior Publication Data
US 2022/0052628 A1 Feb. 17, 2022

(30) Foreign Application Priority Data

Nov. 27, 2018 (GB) ...................... 1819309

(51) Int. Cl.
*H02N 1/04* (2006.01)
(52) U.S. Cl.
CPC ..................... *H02N 1/04* (2013.01)
(58) Field of Classification Search
CPC .......................................................... H02N 1/04
See application file for complete search history.

(56) References Cited

U.S. PATENT DOCUMENTS

| 6,043,632 A * | 3/2000 | Maehara | ............. H02P 9/006 322/33 |
| 2015/0001993 A1* | 1/2015 | Heo | ............. H10N 30/30 310/319 |
| 2018/0263328 A1* | 9/2018 | Wang | ............. A43B 3/38 |

FOREIGN PATENT DOCUMENTS

| CN | 105897036 A * | 8/2016 | ............. H02N 1/04 |
| CN | 105897036 A | 8/2016 | |

(Continued)

OTHER PUBLICATIONS

CN-105897036-A_translation.*

(Continued)

*Primary Examiner* — Tulsidas C Patel
*Assistant Examiner* — Mohammed Ahmed Qureshi
(74) *Attorney, Agent, or Firm* — Ryan Dean; Umberg Zipser LLP (57) ABSTRACT A triboelectric generator comprises a first body moveable relative to a second body. Power generation modules are disposed on the first body and one or more actuating elements are disposed on the second body. Each power generation module is electrically connected to a common output and comprises material capable of generating electrical power through the triboelectric effect when contacting another surface. The power generation modules and one or more actuating elements are arranged on the bodies such that relative movement of the bodies causes the one or more actuating elements to come into contact with the power generation modules, wherein the contact causes the material of that power generation module to be brought into contact with said other surface to generate electrical power. The power generation modules may supply electrical power to (Continued)

the common output at different times, providing a more continuous supply of electrical power from the common output.

21 Claims, 6 Drawing Sheets

(56) References Cited

FOREIGN PATENT DOCUMENTS

| KR | 20170002363 A | * | 1/2017 | ............... H02N 1/04 |
| WO | WO-2017108546 A1 | * | 6/2017 | ............ F02B 27/008 |

OTHER PUBLICATIONS

KR20170002363A_translation.*
KR20170002363A_translate (Year: 2017).*
CN-105897036-A_translate (Year: 2016).*
European Patent Office, International Search Report and Written Opinion, dated Feb. 24, 2020, 2 pages.

* cited by examiner

TRIBOELECTRIC GENERATOR

TECHNICAL FIELD

The present invention relates to a triboelectric generator for generating electrical power using the triboelectric effect.

BACKGROUND

Triboelectric generators have been developed which use contact-separation movement to generate electrical power through the triboelectric effect. However, the contact-separation movement only induces intermittent current as two surfaces come into contact, with the polarity of the current then reversing when the surfaces are separated. The output current produced by such contact-separation triboelectric generators is therefore alternating and intermittent, limiting the usefulness of such devices.

The invention is made in this context.

SUMMARY OF THE INVENTION

According to a first aspect of the present invention, there is provided a triboelectric generator for generating electrical power using the triboelectric effect, the triboelectric generator comprising: a first body; a second body moveable relative to the first body; a plurality of power generation modules disposed on the first body, the plurality of power generation modules each being electrically connected to a common output and comprising material capable of generating electrical power through the triboelectric effect when brought into contact with another surface, and one or more actuating elements disposed on the second body, wherein the plurality of power generation modules and the one or more actuating elements are arranged on the first and second bodies such that relative movement of the first and second bodies can cause the one or more actuating elements to come into contact with the plurality of power generation modules, wherein the contact between one of the one or more actuating elements and one of the power generation modules causes the material of said one of the power generation modules to be brought into contact with said other surface so that electrical power is generated, and wherein the triboelectric generator is configured such that the plurality of power generation modules supply electrical power to the common output at different times during the relative movement of the first and second bodies.

In some embodiments according to the first aspect, the one or more actuating elements are arranged so as to come into contact with the power generation modules at different times during the relative movement of the first and second bodies.

In some embodiments according to the first aspect, the relative movement comprises relative linear movement of the first and second bodies.

In some embodiments according to the first aspect, the one or more actuating elements comprises a plurality of actuating elements, and a distance between adjacent ones of the power generation modules is different to a distance between adjacent ones of the plurality of actuating elements, such that said adjacent actuating elements contact said adjacent power generation modules at different times during the relative linear movement.

In some embodiments according to the first aspect, the relative movement comprises rotation of the first body relative to the second body.

In some embodiments according to the first aspect, the one or more actuating elements comprises a plurality of actuating elements, and an angular spacing between adjacent ones of the power generation modules is different to an angular spacing between adjacent ones of the plurality of actuating elements, such that said adjacent actuating elements contact said adjacent power generation modules at different times during the relative rotation of the first and second bodies.

In some embodiments according to the first aspect, the first body at least partially surrounds the second body such that the second body rotates within the first body, and each one of the plurality of power generation modules is disposed on the first body and extends inwardly towards the second body from the first body.

In some embodiments according to the first aspect, the second body at least partially surrounds the first body such that the first body rotates within the second body, and each one of the plurality of power generation modules extends outwardly from the first body towards the second body.

In some embodiments according to the first aspect, the plurality of power generation modules comprise a plurality of first power generation modules and one or more of the plurality of actuating elements comprise a second power generation module, such that when one of the first power generation modules is actuated by the second power generation module to produce electrical power, the second power generation module is simultaneously actuated by said one of the first power generation modules to produce additional electrical power.

In some embodiments according to the first aspect, the power generation modules are arranged to come into contact with said other surface at substantially the same time, the triboelectric generator further comprising means for delaying the power output of one power generation module relative to other ones of the power generation modules, such that the electrical power generated by said one power generation module is supplied to the common output at a different time to the electrical power generated by said other ones of the power generation modules.

In some embodiments according to the first aspect, the means for delaying the power output comprises a delay circuit.

In some embodiments according to the first aspect, the delay circuit comprises one or more active electrical components arranged to be powered from the common output.

In some embodiments according to the first aspect, the triboelectric generator further comprises one or more rectifiers configured to rectify an electric current generated by each of the plurality of power generation modules and supply rectified electric current to the common output.

In some embodiments according to the first aspect, each power generation module comprises: a power generation component comprising the material capable of generating electrical power through the triboelectric effect; and a first contact surface comprising said other surface arranged to be brought into contact with the material, wherein the first contact surface is spaced apart from the power generation component by a distance such that when the power generation component is deflected in a direction towards or away from the first contact surface and subsequently released, the power generation component oscillates and repeatedly makes contact with the first contact surface, thereby generating electrical power. In this way, the power generation module can generate electric power through a combination of the triboelectric effect and electrostatic induction.

In some embodiments according to the first aspect, each power generation module comprises first and second electrodes, wherein the power generation component and the first contact surface are disposed between the first and second electrodes such that the oscillation of the power generation component induces a potential difference between the first and second electrodes, and wherein the first and second electrodes are connected to the common output.

In some embodiments according to the first aspect, the triboelectric generator further comprises a plurality of rectifiers each connected to a respective one of the plurality of power generation modules, each rectifier comprising a first input, a second input, a positive output and a negative output, wherein the common output comprises a positive terminal and a negative terminal, and wherein the first electrode of one of the power generation modules is electrically connected to the first input of a respective one of the plurality of rectifiers, the second electrode of said one of the power generation modules is electrically connected to the second input of said one of the plurality of rectifiers, the positive output of said one of the plurality of rectifiers is connected to the positive terminal, and the negative output of said one of the plurality of rectifiers is connected to the negative terminal.

In some embodiments according to the first aspect, the first contact surface consists of the first electrode.

In some embodiments according to the first aspect, the first contact surface comprises a triboelectric layer disposed on the first electrode, such that the power generation component repeatedly makes contact with the triboelectric layer during the oscillation of the power generation component.

In some embodiments according to the first aspect, the triboelectric material is formed as a sheet, and the first and second electrodes can be arranged to overlap at least part of the sheet of triboelectric material.

In some embodiments according to the first aspect, the first contact surface comprises a different material to the power generation component.

In some embodiments according to the first aspect, each power generation module further comprises a second contact surface disposed on an opposite side of the power generation component to the first contact surface, such that the power generation component alternately contacts the first and second contact surfaces during the oscillation of the power generation component.

In some embodiments according to the first aspect, the power generation component and the first contact surface extend away from a surface of the first body towards the one or more actuating elements, the power generation component extending further away from the first body than the first contact surface, and a separation distance between the first and second bodies is set such that during the relative movement of the first and second bodies, the one or more actuating elements contact the power generation component but not the first contact surface.

In some embodiments according to the first aspect, the first contact surface has a higher stiffness than the power generation component.

In some embodiments according to the first aspect, each power generation module comprises: a first power generation part disposed on the first body; a second power generation part disposed on the second body, the second power generation part comprising one of the one or more actuating elements; and an electrical connection configured to electrically connect the first power generation part to the second power generation part, wherein the first power generation part comprises the material capable of generating electrical power through the triboelectric effect, and the second power generation part comprises the other surface that is arranged to come into contact with the surface of said material.

In some embodiments according to the first aspect, the triboelectric generator comprises a plurality of rectifiers each connected to a respective one of the plurality of power generation modules, each rectifier comprising a first input, a second input, a positive output and a negative output, wherein the common output comprises a positive terminal and a negative terminal, and wherein the first power generation part of one of the power generation modules is electrically connected to the first input of a respective one of the plurality of rectifiers, the second power generation part of said one of the power generation modules is electrically connected to the second input of said one of the plurality of rectifiers, the positive output of said one of the plurality of rectifiers is connected to the positive terminal, and the negative output of said one of the plurality of rectifiers is connected to the negative terminal.

According to a second aspect of the present invention, there is provided apparatus comprising first and second pails arranged to move relative to one another during normal operation of the apparatus, and a triboelectric generator according to the first aspect for harvesting electrical power from the relative movement of the first and second parts of the apparatus, wherein the first body of the triboelectric generator comprises or is physically connected to the first part of the apparatus, and the second body of the triboelectric generator comprises or is physically connected to the second part of the apparatus.

In some embodiments according to the second aspect, the apparatus is configured to be worn on a human or animal body, such that movement of said human or animal body causes the first and second parts to move relative to one another.

In some embodiments according to the second aspect, the apparatus comprises an item of clothing.

In some embodiments according to the second aspect, the first and second pails comprise layers of material arranged to slide over one another.

In some embodiments according to the second aspect, the apparatus comprises machinery configured to produce linear and/or rotational motion.

BRIEF DESCRIPTION OF THE DRAWINGS

Embodiments of the present invention will now be described, by way of example only, with reference to the accompanying drawings, in which.

DETAILED DESCRIPTION

In the following detailed description, only certain exemplary embodiments of the present invention have been shown and described, simply by way of illustration. As those skilled in the art would realise, the described embodiments may be modified in various different ways, all without departing from the scope of the present invention. Accordingly, the drawings and description are to be regarded as illustrative in nature and not restrictive. Like reference numerals designate like elements throughout the specification.

Figure 1:
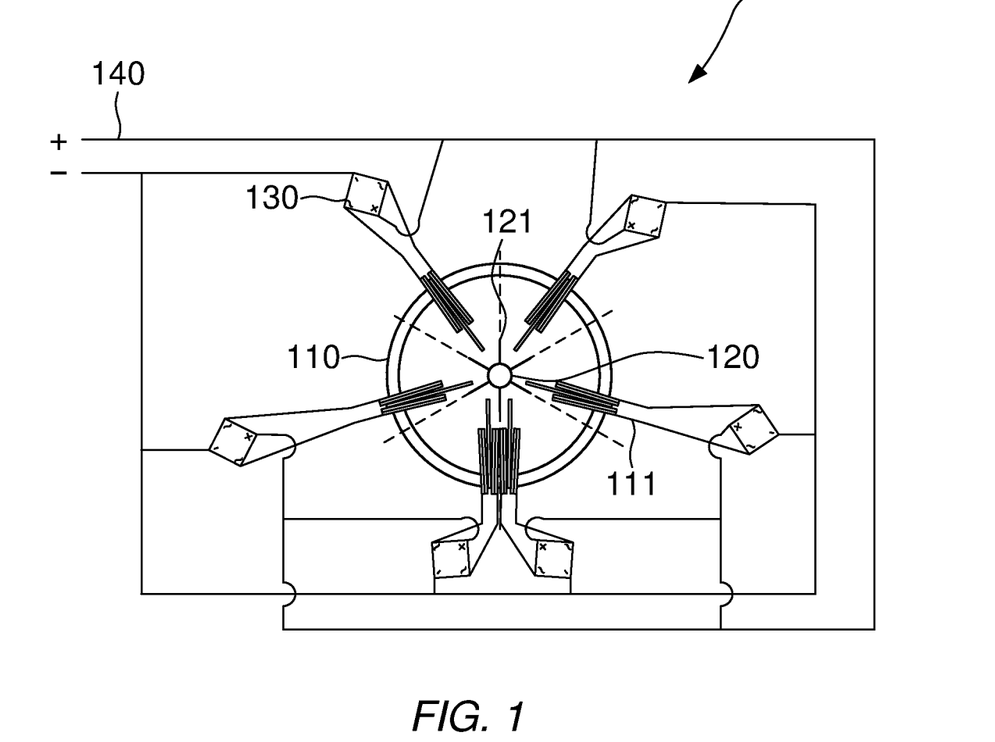
FIG. 1 illustrates a triboelectric generator for generating electrical power using the triboelectric effect, according to an embodiment of the present invention.

Referring now to FIGS. 1 to 8, a triboelectric generator for generating electrical power using the triboelectric effect is illustrated according to an embodiment of the present invention. As shown in FIG. 1, the triboelectric generator 100 of the present embodiment comprises a first body 110 and a second body 120. The first body 110 and the second body 120 are configured to be moveable relative to each other. In the present embodiment the first body 110 is pivotably connected to the second body 120, such that the second body 120 is free to rotate independently of the first body 110. In other embodiments the first and second bodies may be configured so as to permit different types of relative movement, such as linear and/or reciprocal movement.

The triboelectric generator 100 further comprises a plurality of power generation modules in disposed on the first body 110, and one or more actuating elements 121 disposed on the second body 120. The actuating elements 121 may, for example, comprise protrusions integrally formed with the second body 120. As can be seen from FIG. 1, the plurality of power generation modules in and the one or more actuating elements 121 are arranged on the first and second bodies 110, 120 such that relative movement of the first and second bodies 110, 120 can cause the one or more actuating elements 121 to come into contact with the plurality of power generation modules in. Each power generation module in comprises triboelectric materials that can generate electrical power through the triboelectric effect when brought into contact with each other, and the plurality of power generation modules 111 are electrically connected to a common output 140, which comprises positive and negative terminals.

In some embodiments, each actuating element 121 disposed on the second body 120 may comprise a power generation module similar to the power generation modules in disposed on the first body. That is, the plurality of power generation modules may comprise a plurality of first power generation modules and one or more of the plurality of actuating elements may comprise a second power generation module, such that when one of the first power generation modules is actuated by the second power generation module to produce electrical power, the second power generation module is simultaneously actuated by said one of the first power generation modules to produce additional electrical power. In this way, the power generation modules 111, 121 on the first and second bodies 110, 120 can each act as actuating elements for one of the power generation modules 111, 121 on the other one of the first and second bodies 110, 120. In such embodiments, the total power output of the triboelectric generator 100 can be increased, since electrical power is generated both by the power generation modules in on the first body 110 and by the power generation modules 121 on the second body 120.

In the present embodiment the triboelectric generator 100 comprises six power generation modules in and six actuating elements 121. However, in other embodiments the triboelectric generator may comprise a different number of power generation modules 111 and/or actuating elements 121. In the present embodiment the six actuating elements 121 are distributed symmetrically around the second body 120 at regular angular intervals of 60°. It will be appreciated that different positions and angular spacing of the actuating elements 121 may be used in other embodiments, depending on the total number of actuating elements 121 included in the generator 100.

When one of the actuating elements 121 makes contact with one of the power generation modules 111, an electric current is induced in the power generation module 111. Power can therefore be generated through a combination of the triboelectric effect and electrostatic induction, since the triboelectric effect results in charge separation when the two surfaces are brought into contact, and then an electric current is induced as the charged surfaces are subsequently separated and contacted. In the present embodiment, an output phase shift of 60° is obtained between adjacent power generation modules in by providing a different angular spacing between adjacent ones of the power generation modules 111 to the angular spacing between adjacent ones of the plurality of actuating elements 121. Accordingly, the actuating elements 121 make contact with the power generation modules 111 at different times during the relative rotation of the first and second bodies 110, 120, resulting in a corresponding phase shift between the electrical outputs of the power generation modules 111. In this way, the triboelectric generator 100 is configured such that the plurality of power generation modules 111 supply electrical power to the common output 140 at different times during the relative movement of the first and second bodies 110, 120, thereby to provide a more continuous supply of electrical power from the common output 140 in comparison to prior art devices which only produce a discontinuous sporadic output pulse.

When an electric current is induced by the triboelectric effect as a result of contact between two materials, an electric current of the opposite polarity is induced when the materials are subsequently separated. Accordingly, in embodiments of the present invention, the electrical outputs of the plurality of power generation modules 111 can be rectified to provide a more direct current (DC)-like output. By phase-shifting, rectifying, and combining the outputs of a plurality of triboelectric power generation modules, a near-DC power output can be provided. Embodiments of the present invention can therefore be used to generate electric power through the triboelectric effect and supply power to DC components. In contrast, conventional triboelectric generators only provide a momentary pulse of electrical power and so are not suitable for powering DC components.

In the present embodiment, the triboelectric generator further comprises a plurality of rectifiers 130, each of which is connected to a respective one of the plurality of power generation modules 111. In the present embodiment the plurality of rectifiers 130 are full bridge rectifiers, but in other embodiments different types of rectifier may be used. The outputs of the plurality of rectifiers 130 are connected to the common output 140. In some embodiments, the outputs of the plurality of power generation modules in may be combined before rectification. However, under some circumstances, depending on the speed of the relative movement between the first and second bodies 110, 120, the phase shift between the plurality of power generation modules 111 may cause the outputs of two or more of the power generation modules 111 to cancel each other, reducing the total power output. Hence, in the present embodiment the output of each power generation module 111 is rectified before combining the rectified outputs of the plurality of power generation modules in.

In the present embodiment, the first body no at least partially surrounds the second body 120 such that the second body 120 rotates within the first body 110. The plurality of power generation modules 111 are arranged around the first body 120 and extend inwardly towards the second body 120. The one or more actuating elements 121 extend outwardly from the second body 120 towards one or more of the power generation modules 111, so that the actuating elements 121 make contact with the power generation modules 111 as the first and second bodies 110, 120 rotate with respect to one another. This provides a compact arrangement which allows the overall volume of the triboelectric generator 100 to be reduced.

In other embodiments different arrangements may be used. For example, in one embodiment the first and second bodies may be similar in size, and may be disposed along a common axis of rotation. In this embodiment, the plurality of power generation modules may be disposed on a surface of the first body that faces the second body, and the one or more actuating elements (which may themselves be power generation modules, as described above) may be disposed on a surface of the second body that faces the first body, with the power generation modules and actuating elements being disposed at similar distances from the common axis. The surface of the first body can be considered as rotating against the surface of the second body, although it will be appreciated that the first and second bodies may not physically contact one another due to the presence of the power generation modules and actuating elements between the first and second bodies. This arrangement can allow the overall diameter of the triboelectric generator wo to be reduced.

As a further example, in another embodiment the second body may at least partially surround the first body such that the first body rotates within the second body. In this embodiment, the plurality of power generation modules can be arranged around the first body and can extend outwardly towards the second body, and the one or more actuating elements can extend inwardly from the second body towards one or more of the power generation modules. In this way, the positioning of the power generation modules and the actuating elements is inverted in comparison to the arrangement illustrated in FIG. 1. This arrangement may be advantageous in applications where the first body will remain fixed relative to another apparatus that is connected to the common output to be powered by the generation, by allowing fixed electrical connections to be used between the power generation modules, the common output, and the apparatus.

Figure 2:
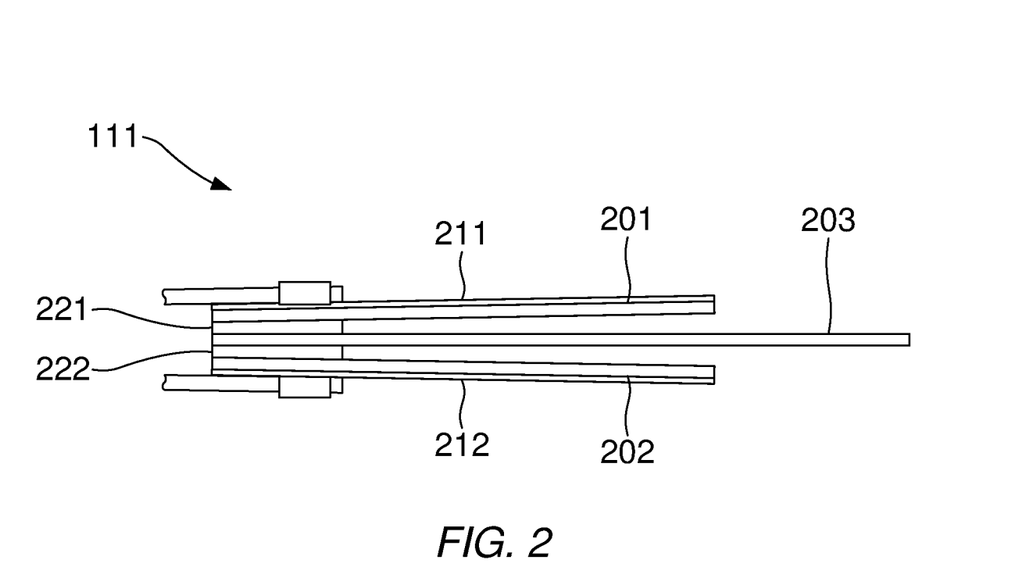
FIG. 2 illustrates a power generation module in the triboelectric generator of FIG. 1, according to an embodiment of the present invention.

FIG. 2 illustrates one of the power generation modules 111 in further detail. In the present embodiment, the power generation module in comprises a power generation component 203 comprising material that is capable of generating electrical power through the triboelectric effect when brought into contact with another surface. In the present embodiment the power generation component 203 comprises a sheet of material. For convenience, the material within the power generation component 203 that generates power through the triboelectric effect is hereinafter referred to as "triboelectric material". The power generation component 203 and the other surface that is brought into contact with the power generation component 203 can be formed from any suitable combination of materials. In some embodiments the power generation component 203 and the other surface may comprise the same material. However, a higher power output may be achieved when different materials are used for the power generation component 203 and the other surface.

The power generation component 203 is clamped at one end, and has a free (i.e. unsupported) end that is disposed to come into contact with the one or more actuating elements 121 during relative rotation of the first and second bodies 110, 120. As each actuating element 121 contacts the power generation component 203, the sheet of triboelectric material is elastically deflected. Then, as the actuating element 121 continues to rotate past the power generation module in, the power generation component 203 is released and springs back in the opposite direction to the direction in which the power generation component 203 was deflected by the actuating element 121.

In the present embodiment, the power generation module in further comprises a first contact surface 201 and a second contact surface 202. The first and second contact surfaces 201, 202 are each spaced apart from the power generation component 203 by a distance such that when the triboelectric material 203 is deflected in a direction towards or away from the first contact surface 201 or the second contact surface 202 and subsequently released, the power generation component 203 oscillates and repeatedly makes contact with the first contact surface 201 and the second contact surface 202.

As described above, the power generation component 203 comprises material that can generate electric power through the triboelectric effect and electrostatic induction when brought into contact (and separated) with a material of the first and second contact surfaces 201, 202. Therefore as a result of the triboelectric material being deflected by the one or more actuating elements 121 and repeatedly brought into contact with the first and second contact surfaces 201, 202 due to oscillation of the triboelectric material 203, electrical power can be generated through the triboelectric effect and electrostatic induction.

In the present embodiment, the power generation component 203 comprises a first triboelectric material, and the first and second contact surfaces 201, 202 comprise triboelectric material that is different to the first triboelectric material. The first and second contact surfaces 201, 202 may comprise the same material as each other, or may comprise different materials. When two different triboelectric materials are brought into contact, greater charge separation occurs than is typically the case if the same materials are used, and therefore more power can be generated when the triboelectric material 203 comprises a different material to the first and second contact surfaces 201, 202. For example, in the present embodiment the first and second contact surfaces 201, 202 are formed from polyethylene terephthalate (PET), and the power generation component 203 is formed from polyethylene (PE). In other embodiments different materials may be used for the first and second contact surfaces 201, 202 and the power generation component 203, including but not limited to metals, polymers and semiconductors. However, even when the same material is used for the all three elements of the power generating module 111, i.e. the sheet of triboelectric material 203 and the first and second contact surfaces 201, 202, a limited amount of electrical power may still be generated, and accordingly in some embodiments the sheet of triboelectric material 203 and the first and second contact surfaces 201, 202 may all comprise the same material.

Continuing with reference to FIG. 2, in the present embodiment the power generation module in further comprises first and second electrodes 211, 212. As described above, in the present embodiment the power generation component 203 comprises a sheet of triboelectric material, and the first and second electrodes 211, 212 are arranged to overlap at least part of the sheet of triboelectric material. In this way, a larger current can be induced in the first and second electrodes 211, 212 due to the high surface area of overlap between the first and second electrodes 211, 212 and the sheet of triboelectric material 203. In the present embodiment the first and second electrodes 211, 211 are formed as planar electrodes, but in other embodiments the first and/or second electrode 211, 212 may have a curved surface.

The first electrode 211 and the second electrode 212 are disposed on opposite sides of the power generation component 203. Furthermore, the first electrode 211 is disposed on an opposite side of the first contact surface 201 to the power generation component 203, and the second electrode 212 is disposed on an opposite side of the second contact surface 202 to the power generation component 203. In other words, the first contact surface 201 is disposed between the first electrode 211 and the power generation component 203, and the second contact surface 202 is disposed between the second electrode 212 and the power generation component 203. As the power generation component 203 oscillates and repeatedly makes contact with the first and second contact surfaces 201, 202, triboelectric charge separation occurs between the triboelectric material 203 and the first and second contact surfaces 201, 202. Therefore a potential difference between the first and second electrodes 211, 212 is induced, and an output current is produced by the power generation module in.

In the present embodiment the first electrode 211 comprises an electrically conductive layer included in the first contact surface 201, and the first contact surface 201 further comprises a triboelectric layer disposed between the electrically conductive layer and the power generation component 203, such that the sheet of triboelectric material 203 makes contact with the triboelectric layer of the first contact surface 201 during the oscillation of the sheet of triboelectric material 203. In another embodiment, the triboelectric layer in the first contact surface 201 may be omitted, such that the first contact surface 201 consists of the first electrode 211. In this embodiment, an electric current can still be induced in the first electrode 211 due to the triboelectric effect when the sheet of triboelectric material 203 comes into direct physical contact with the surface of the first electrode 211.

In some embodiments the second contact surface 202 may be omitted, and the second electrode 212 may be formed on a surface of the sheet of triboelectric material 203 on an opposite side to the first contact surface 201. Alternatively, in other embodiments the first contact surface 201 may be omitted. However, the provision of both first and second contact surfaces 201, 202 on opposite sides of the power generation component 203 can increase the power output of the power generation module in and therefore the triboelectric generator 100. In particular, in embodiments such as the one shown in FIG. 2, an electric current will be induced due to triboelectric charge separation when the power generation component 203 is at the top and at the bottom of the oscillation triggered by the actuating element 121. In contrast, in embodiments in which one of the first and second contact surfaces 201, 202 is omitted, the degree of electrostatic induction is relatively low, resulting in a lower power output.

As described above, in the present embodiment the triboelectric generator 100 comprises a plurality of rectifiers 130 each connected to a respective one of the plurality of power generation modules in. Each rectifier 130 comprises a first input, a second input, a positive output and a negative output. The first electrode 211 of the respective power generation module 111 is electrically connected to the first input of the rectifier 130, and the second electrode 212 of the respective power generation module 111 is electrically connected to the second input of the rectifier 130. As described above, the total power output of the triboelectric generator 100 can be maximised by rectifying the output of each power generation module in before combining the rectified outputs, since this can avoid a situation in which the outputs of two or more of the power generation modules in cancel each other when superimposed due to opposite polarities, reducing the total power output.

Continuing with reference to both FIGS. 1 and 2, in the present embodiment the sheet of triboelectric material 203 and the first and second contact surfaces 201, 202 extend away from a surface of the first body no towards the one or more actuating elements 121, and the sheet of triboelectric material 203 extends further away from the first body no than the first and second contact surface 201, 202. Additionally, a separation distance between the first and second bodies 110, 120 is set such that during the relative movement of the first and second bodies 110, 120, the one or more actuating elements 121 make contact with the sheet of triboelectric material 203 but not with the first or second contact surfaces 201, 202. This ensures that the first and second contact surfaces 201, 202 are not deflected by the one or more actuating elements 121, which could otherwise force the first and/or second contact surfaces 201, 202 away from the sheet of triboelectric material 203 to such an extent that the sheet of triboelectric material 203 no longer makes physical contact with the first and/or second contact surfaces 201, 202.

However, in other embodiments the sheet of triboelectric material 203 and the first and second contact surfaces 201, 202 may have the same or similar lengths, such that the one or more actuating elements 121 make contact with the first and/or second contact surfaces 201, 202 in addition to the sheet of triboelectric material 203. In such embodiments, it may be advantageous to form the first and/or second contact surfaces 201, 202 from higher stiffness material than the sheet of triboelectric material 203.

The power generation module in illustrated in FIG. 2 can be referred to as a contact-separation mode free-standing triboelectric generator module (FSTEG), which is considered to be the most efficient form of triboelectric generator for energy harvesting applications. By combining a plurality of the power generation modules in of FIG. 2 into a generator 100 that utilises rotary movement, as in the embodiment shown in FIG. 1, embodiments of the present invention can convert abundantly available rotary movement into the most efficient FSTEG working mode, providing higher efficiencies per unit area of the device in comparison to conventional triboelectric generators. Additionally, by engineering a phase shift between the outputs of a plurality of triboelectric power generation modules and rectifying the outputs, as described above, near-DC power can be generated and used to power a range of devices.

The operation of the triboelectric generator shown in FIGS. 1 and 2 will now be described in more detail with reference to the graphs in FIGS. 3 to 8. The graphs in FIGS. 3 to 6 illustrate simulated current outputs through a 1 giga-ohm (GΩ) load resistance, while FIGS. 7 and 8 illustrate experimental data obtained from tests on a triboelectric generator similar to the one shown in FIG. 1.

Figure 3:
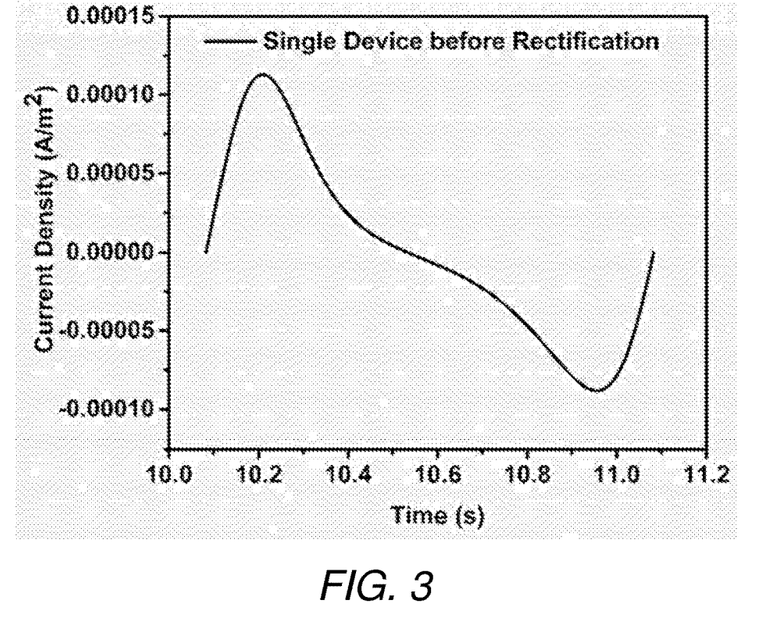
FIG. 3 is a graph showing the simulated output current of the power generation module during a single output cycle, according to an embodiment of the present invention.
Figure 4:
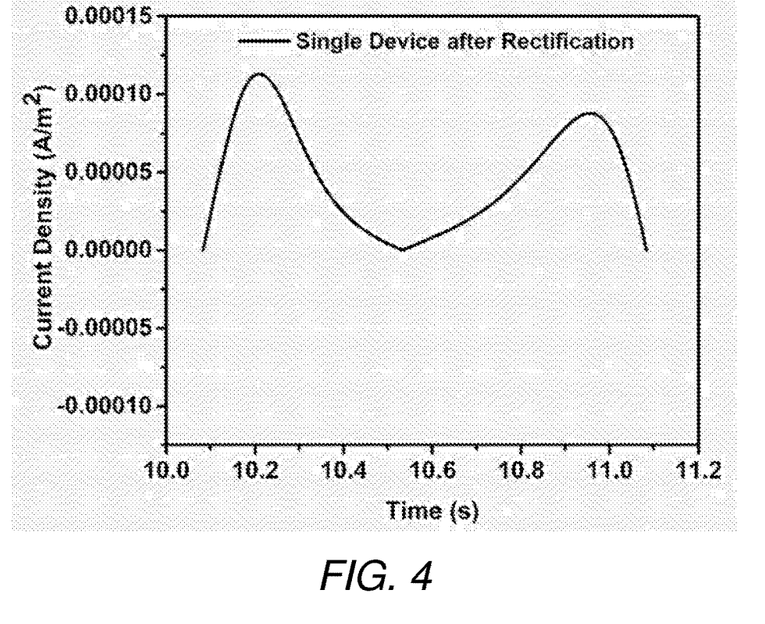
FIG. 4 is a graph showing the simulated output current of a single power generation module after rectification, according to an embodiment of the present invention.

FIG. 3 is a graph showing the simulated output current of the power generation module in of FIG. 2 during a single output cycle (i.e. a single contact and separation cycle), which produces a single positive peak and a single negative peak in the output current. FIG. 4 is a graph showing the simulated output of the power generation module in after rectification using the rectifier 130.

Figure 5:
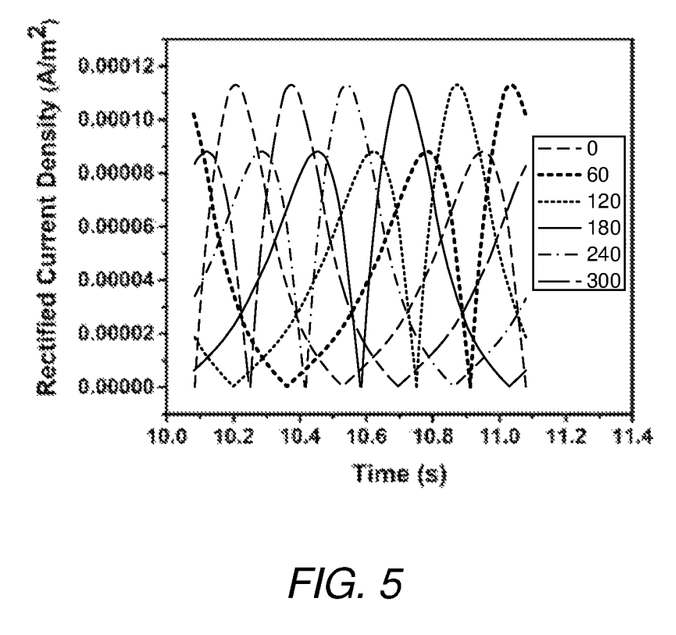
FIG. 5 is a graph showing the simulated output current of the six power generation modules in the triboelectric generator of FIG. 1, according to an embodiment of the present invention.
Figure 6:
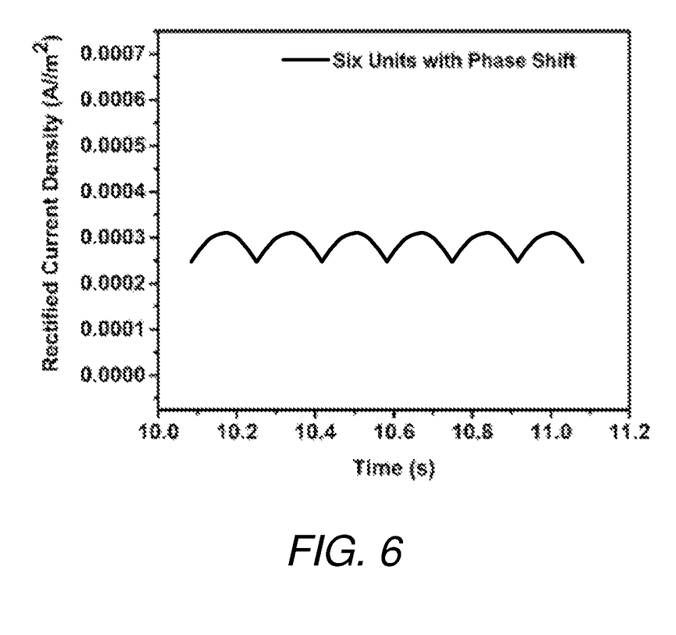
FIG. 6 is a graph showing the overall simulated current signal at the common output, according to an embodiment of the present invention.

Many electronic devices require a power supply which provides a substantially constant output current. Accordingly, as described above, in the present embodiment a phase-shift is introduced between the outputs of the plurality of power generation modules 111. FIG. 5 is a graph showing the simulated rectified output current of the six power generation modules 111 in the triboelectric generator 100 of FIG. 1, during a single rotation of the second body 120 relative to the first body 110. The current signals from each of the power generation modules 111 peak at different points in time, with a gradual shift in the peak positions corresponding to the different times at which each power generation module 111 comes into contact with one of the actuating elements 121. FIG. 6 is a graph showing the overall current signal at the common output 140, which results from the addition of all of the rectified and phase-shifted outputs of the plurality of power generation modules in. The final output is a high current output with relatively little variation in magnitude compared to conventional triboelectric generators, and may be referred to as a near-DC output current.

Figure 7:
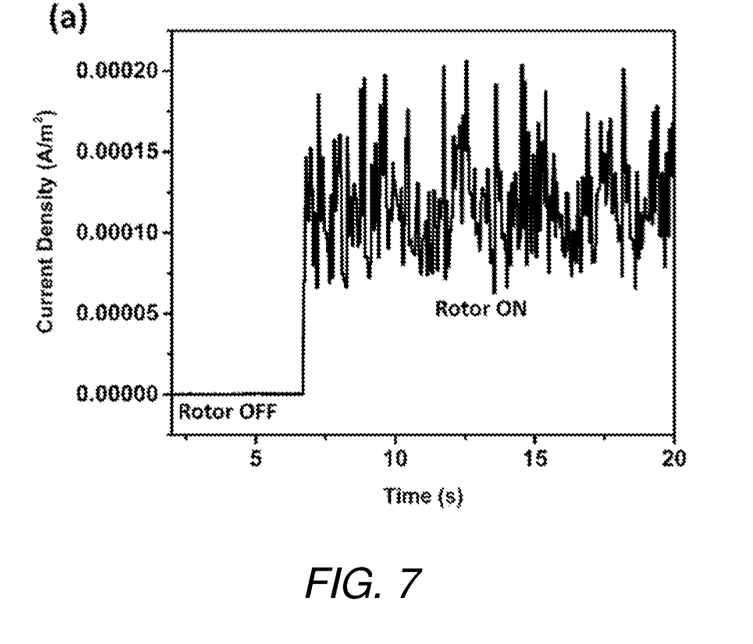
FIG. 7 is a graph of experimental data showing the output current measured at the common output over time, according to an embodiment of the present invention.
Figure 8:
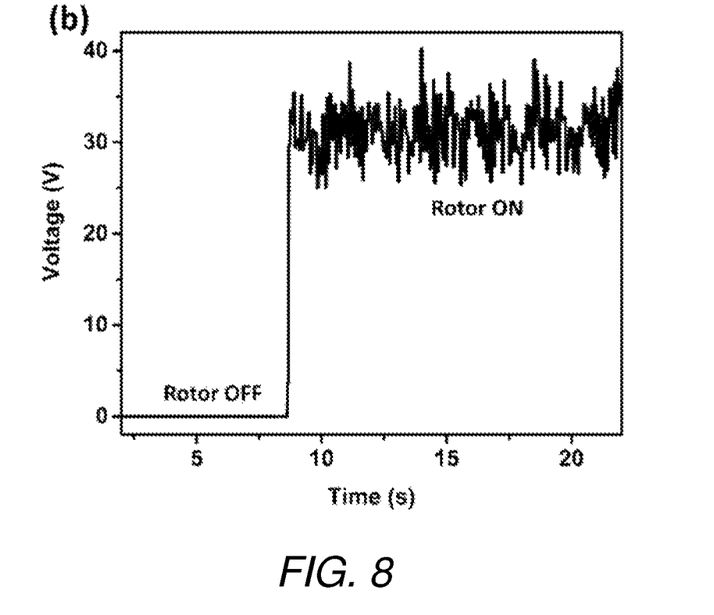
FIG. 8 is a graph of experimental data showing the output voltage measured at the common output over time, according to an embodiment of the present invention.

Referring now to FIGS. 7 and 8, graphs of measured electrical outputs obtained during experiments are illustrated, confirming the simulated trend shown in FIG. 6. The data in FIGS. 7 and 8 was obtained using a triboelectric generator similar to the one shown in FIG. 1, with a load resistance of 100 mega-ohms (MΩ). FIG. 7 is a graph showing the output current measured at the common output 140 over time, comprising a first time interval in which the second body 120 is stationary (the time period labelled "Rotor OFF" in FIG. 7), followed by a second time interval in which the second body 120 is rotated relative to the first body 110 (the time period labelled "Rotor ON" in FIG. 7) at a speed of around 100 rpm. As shown in FIG. 7, a sustainable non-zero current output is obtained, which resembles a continuous near DC output current. Similarly, FIG. 8 is a graph showing the output voltage measured at the common output 140 over a similar time period, illustrating that near-DC output voltage is obtained. The data plotted in FIG. 7 was obtained during an experiment in which the rotor was turned on at about 7 seconds, whilst the data plotted in FIG. 8 was obtained during another experiment in which the rotor was turned on at about 8.5 seconds.

Further tests carried out by the inventors using a triboelectric generator similar to the one shown in FIG. 1 have demonstrated that the generator is capable of operating at a wide range of frequencies, including at least from 0.1 Hertz (Hz) up to woo Hz, and at a range of rotation speeds from 3 revolutions per minute (rpm) up to about 2000 rpm. The triboelectric generator has been demonstrated to produce an output voltage of around 120 V and a current density in the range of milliamps per metre squared (mA/m$^2$).

Figure 9:
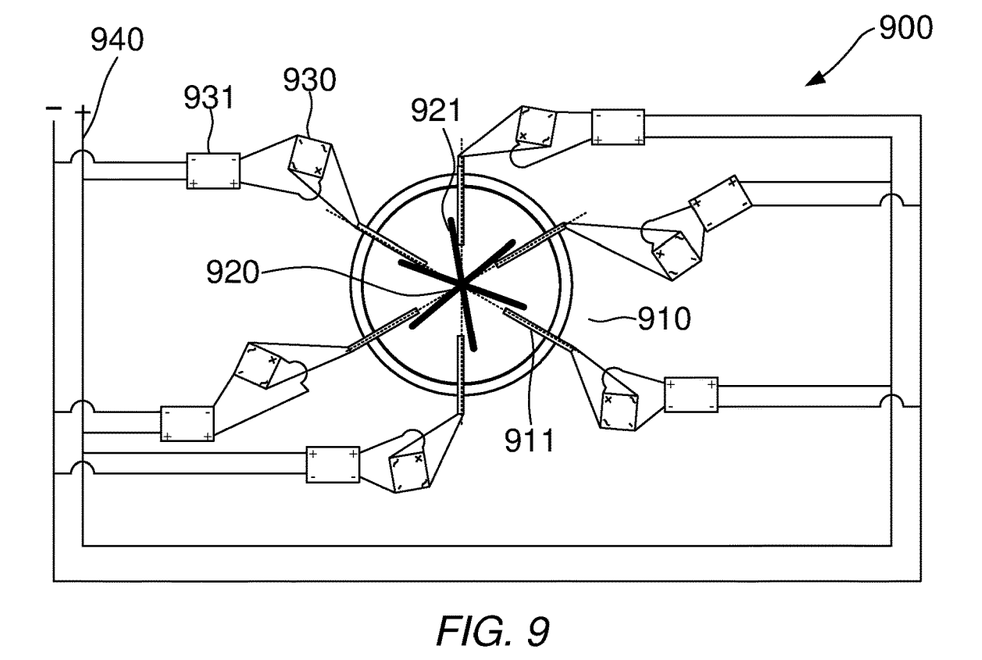
FIG. 9 illustrates a triboelectric generator according to another embodiment of the present invention.

Referring now to FIG. 9, a triboelectric generator is illustrated according to another embodiment of the present invention. Like the embodiment of FIG. 1, the triboelectric generator 900 of the present embodiment comprises a first body 910, a second body 920, a plurality of power generating modules 911 and a plurality of actuating elements 921. Similarly, each of the power generating modules 911 is connected to the common output 940 via a respective one of a plurality of rectifiers 930. However, in contrast to the embodiment of FIG. 1, in the present embodiment the plurality of actuating elements 921 are arranged so as to come into contact with different ones of the power generation modules 911 at substantially the same time.

The triboelectric generator 900 further comprises means 931 for delaying the power output of one power generation module relative to other ones of the power generation modules 911. The means 931 for delaying the power output may also be referred to as a delay unit, or a delay circuit. In some embodiments the delay circuit 931 may comprise one or more active electrical components which require electrical power to function, and the one or more active electrical components can be arranged to be powered from the common output. In this way, the delay circuit 931 can operate without the need for an external power supply.

A plurality of delay units 931 can be configured to delay the power outputs of the plurality of power generation modules 911 by different amounts of time, so as to introduce a phase shift between the outputs of different power generation modules 911. Accordingly, the use of delay units 931 allows the electrical power generated by one of the power generation modules 911 to be supplied to the common output 940 at a different time to the electrical power generated by other ones of the power generation modules. In this embodiment a phase shift is introduced electrically via the delay units 931, as opposed to the embodiment shown in FIG. 1, in which a phase shift is introduced mechanically by arranging the actuating elements 121 to make contact with the power generation modules 111 at different points in time.

Figure 10:
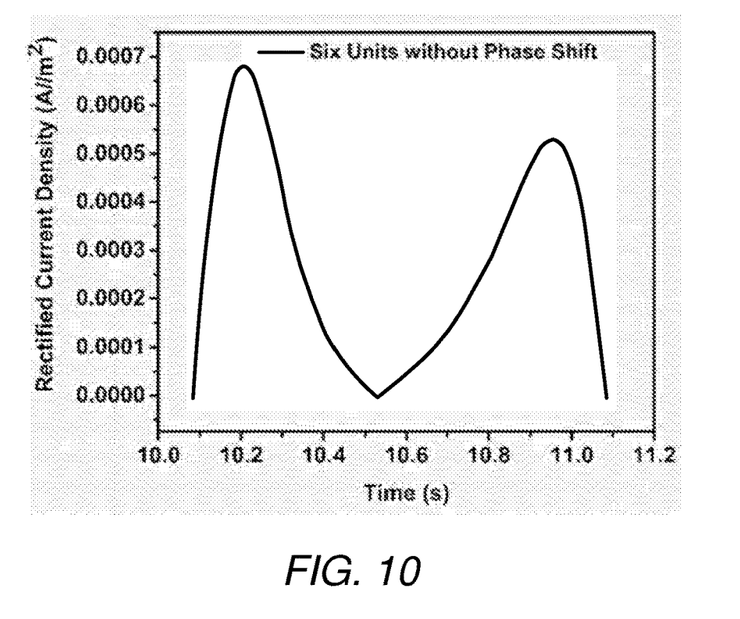
FIG. 10 illustrates a simulated output current of the triboelectric generator of FIG. 9 without phase shifts, according to an embodiment of the present invention.

In embodiments in which the plurality of actuating elements 921 are arranged so as to come into contact with different ones of the power generation modules 911 at substantially the same time, the use of delay units 931 as shown in FIG. 9 allows a near-DC output current to be generated, similar to the example shown in FIG. 7. For comparison purposes, FIG. 10 illustrates a simulated combined output current of the triboelectric generator 900 if the delay units 931 were omitted.

Figure 11:
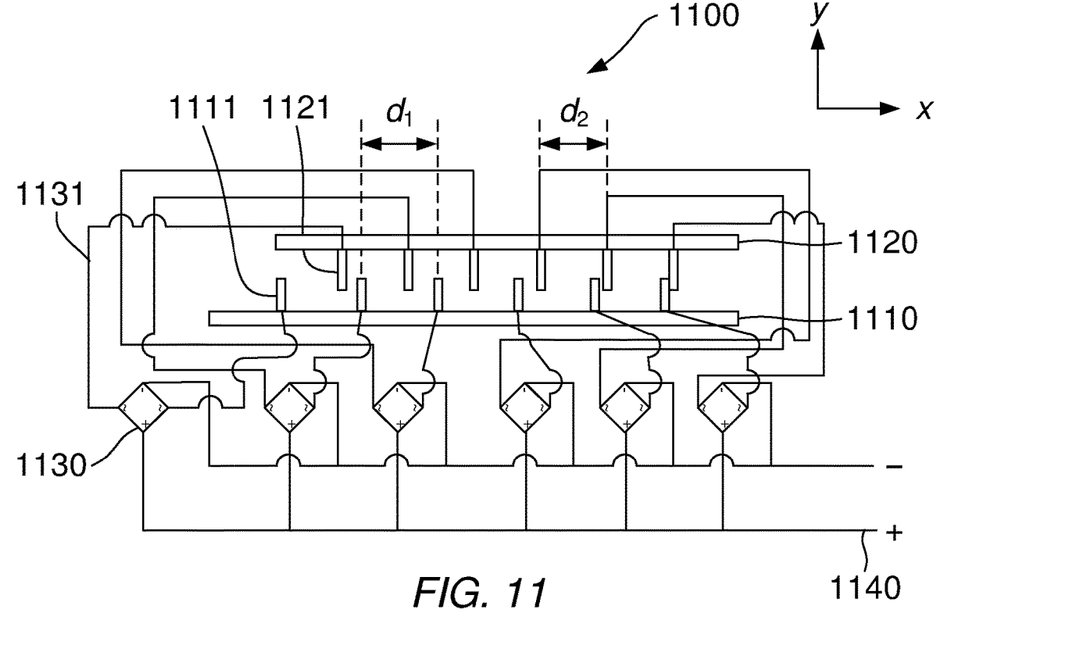
FIG. 11 illustrates a cross-sectional view of a triboelectric generator configured to convert linear motion to electrical power, according to an embodiment of the present invention.

In the above-described embodiments, a triboelectric generator converts rotary motion to electrical power. However, in other embodiments of the present invention, triboelectric generators may be configured to be driven by different types of motion. Referring now to FIG. 11, a triboelectric generator configured to convert linear motion to electrical power is illustrated in cross-section, according to an embodiment of the present invention. In the present embodiment, the triboelectric generator 1100 comprises a first body 1110 and a second body 1120 arranged to move linearly relative to the first body 1110. The triboelectric generator 1100 is configured to convert relative linear motion of the first and second bodies 1110, 1120 to electrical power.

In the present embodiment, each power generation module comprises a first power generation part 1111 disposed on the first body 1110 and a second power generation part 1121 disposed on the second body 1120. The second power generation part 1121 acts as the actuating element for the first power generation part 1111, and the first power generation part 1111 acts as the actuating element for the second power generation part 1121. In this way, both the first and second power generation parts 1111, 1121 of the power generation module generate electrical power through a combination of the triboelectric effect and electrostatic induction, when the first and second power generation parts 1111, 1121 come into contact with each other. Either one of the first and second power generation parts 1111, 1121 can comprise triboelectric material, and the other one of the first and second power generation parts 1111, 1121 comprises the other surface that is arranged to come into contact with the surface of the triboelectric material during relative movement of the first and second bodies 1110, 1120.

Each power generation module further comprises an electrical connection 1131 configured to electrically connect the first power generation part 1111 to the second power generation part 1121. Additionally, in the present embodiment the triboelectric generator 1100 further comprises a plurality of rectifiers 1130 each connected to a respective one of the plurality of power generation modules. Each rectifier 1130 comprises a first input, a second input, a positive output and a negative output. The common output 1140 comprises a positive terminal and a negative terminal, and the first power generation part 1111 of one of the power generation modules is electrically connected to the first input of a respective one of the plurality of rectifiers 1130, the second power generation part 1121 of said one of the power generation modules is electrically connected to the second input of said one of the plurality of rectifiers 1130, the positive output of said one of the plurality of rectifiers 1130 is connected to the positive terminal, and the negative output of said one of the plurality of rectifiers 1130 is connected to the negative terminal. In this way, when each power generation module is triggered to generate electrical power, a rectified current is provided at the common output.

In the present embodiment, a spacing between adjacent ones of the plurality of first power generation parts 1111, $d_1$, is different to a spacing between adjacent ones of the plurality of second power generation parts 1121. In the embodiment shown in FIG. 11, the spacing between adjacent ones of the plurality of first power generation parts 1111 increases from the right-hand side of the apparatus 1100 to the left-hand side, meaning that the distance $d_1$ varies for different pairs of adjacent first power generation parts 1111. The second power generation parts 1121 are spaced apart at regular intervals on the second body 1120. In this way, the second power generation parts 1121 come into contact with the first power generation parts 1111 at different times during relative linear movement of the first and second bodies 1110, 1120. Therefore in the present embodiment, the required phase shift is engineered by selecting appropriate spacings for the first and second power generation parts 1111, 1121. However, in other embodiments the spacing between the first power generation parts and the spacing between the second power generation parts may be the same, such that the plurality of power generation modules are triggered simultaneously, and delay circuits may be used to delay the output of each power generation module by a different amount to introduce the necessary phase shifts, as described above.

It will be appreciated that in others embodiment an opposite arrangement to the one shown in FIG. 11 may be used, wherein the plurality of first power generation parts 1111 are disposed at regular intervals on the first body 1110 and the plurality of second power generation parts 1121 are disposed at varying intervals on the second body 1120. As a further alternative, in some embodiments the plurality of first power generation parts 1111 and the plurality of second power generation parts 1121 can both be spaced apart at regular intervals, with different pitches $d_1$, $d_2$ being used for the first and second power generation parts 1111, 1121.

Figure 12:
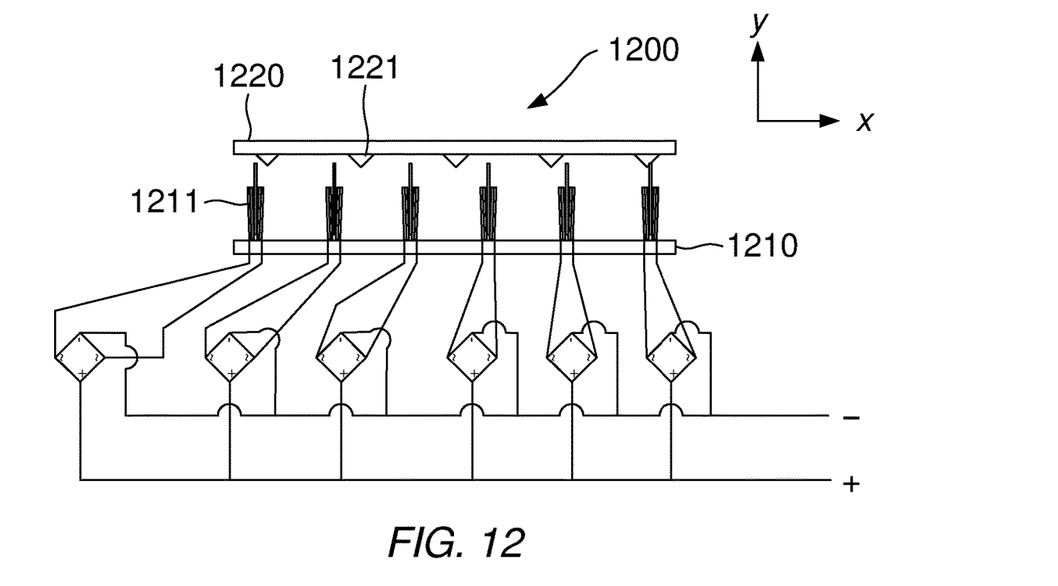
FIG. 12 illustrates a cross-sectional view of a triboelectric generator in which a plurality of power generation modules similar to the one shown in FIG. 2 are arranged to produce power during relative linear motion of first and second bodies, according to an embodiment of the present invention.

Referring now to FIG. 12, a triboelectric generator is illustrated in which a plurality of power generation modules similar to the one shown in FIG. 2 are arranged to produce power during relative linear motion of first and second bodies 1210, 1220, according to an embodiment of the present invention. The triboelectric generator 1200 comprises a plurality of actuating elements 1221 disposed on the second body 1220, and a plurality of power generating modules 1211 disposed on the first body 1210. As with the embodiment of FIG. 11, in the present embodiment the plurality of power generation modules 1211 are spaced apart at regular intervals, and the pitch (distance between adjacent power generation modules 1211) is different to the pitch that is used for the plurality of actuating elements 1221. As a result, the actuating elements 1221 come into contact with the power generation modules 1211 at different times during relative linear movement of the first and second bodies 1210, 1220. Again, as with FIG. 11, in other embodiments the spacing between the power generation modules 1211 and the spacing between the actuating elements 1221 may be the same, such that the plurality of power generation modules 1211 are triggered simultaneously, and delay circuits may be used to delay the output of each power generation module 1211 by a different amount to introduce the necessary phase shifts, as described above.

Embodiments of the present invention have been described in which a triboelectric generator can be used to convert relative motion between two bodies into electrical power. In some embodiments, the triboelectric generator may be coupled to an apparatus that comprises first and second parts arranged to move relative to one another during normal operation of the apparatus, for example machinery configured to produce linear and/or rotational motion, or layers of fabric in an item of clothing that are free to slide over one another. The triboelectric generator can be used to harvest electrical power from the relative movement of the first and second parts of the apparatus, by physically connecting the first and second bodies of the triboelectric generator to the first and second parts of the apparatus, respectively. In some embodiments the first and second bodies may comprise layers of fabric or other flexible material that can be incorporated into clothing.

Whilst certain embodiments of the invention have been described herein with reference to the drawings, it will be understood that many variations and modifications will be possible without departing from the scope of the invention as defined in the accompanying claims.

The invention claimed is:

1. A triboelectric generator for generating electrical power using the triboelectric effect, the triboelectric generator comprising:
   a first body;
   a second body moveable relative to the first body;
   a plurality of power generation modules disposed on the first body, wherein the plurality of power generation modules are each electrically connected to a common output, and wherein each power generation module comprises:
   a power generation component comprising a material capable of generating electrical power through the triboelectric effect and
   a first contact surface spaced apart from the power generation component by a distance such that when the power generation component is deflected in a direction towards or away from the first contact surface and subsequently released, the power generation component oscillates and repeatedly makes contact with the first contact surface, thereby generating electrical power;
   one or more actuating elements disposed on the second body,
   wherein the plurality of power generation modules and the one or more actuating elements are arranged on the first and second bodies, respectively, such that relative movement of the first and second bodies can cause the one or more actuating elements to come into contact with the power generation component of at least one of the power generation modules,
   wherein the contact between one of the one or more actuating elements and the power generation component of a first power generation module of the plurality of power generation modules causes the power generation component of the first power generation module to be brought into contact with the first contact surface of the first power generation module so that electrical power is generated.

2. The triboelectric generator of claim 1, wherein the one or more actuating elements are arranged so as to come into contact with the power generation modules at different times during the relative movement of the first and second bodies, optionally wherein the relative movement comprises relative linear movement of the first and second bodies.

3. The triboelectric generator of claim 1, wherein the one or more actuating elements are arranged so as to come into contact with the power generation modules at different times during the relative movement of the first and second bodies,
   wherein the relative movement comprises relative linear movement of the first and second bodies,
   wherein the one or more actuating elements comprises a plurality of actuating elements, and
   wherein a distance between adjacent ones of the power generation modules is different to a distance between adjacent ones of the plurality of actuating elements, such that said adjacent actuating elements contact said adjacent power generation modules at different times during the relative linear movement.

4. The triboelectric generator of claim 1, wherein the one or more actuating elements are arranged so as to come into contact with the power generation modules at different times during the relative movement of the first and second bodies, wherein the relative movement comprises rotation of the first body relative to the second body.

5. The triboelectric generator of claim 4, wherein the one or more actuating elements comprises a plurality of actuating elements, and
   wherein an angular spacing between adjacent ones of the power generation modules is different to an angular spacing between adjacent ones of the plurality of actuating elements, such that said adjacent actuating elements contact said adjacent power generation modules at different times during the relative rotation of the first and second bodies.

6. The triboelectric generator of claim 4, wherein the first body at least partially surrounds the second body such that the second body rotates within the first body, and
   each one of the plurality of power generation modules extends inwardly towards the second body from the first body, or
   wherein the second body at least partially surrounds the first body such that the first body rotates within the second body, and each one of the plurality of power generation modules extends outwardly from the first body towards the second body.

7. The triboelectric generator of claim 1, wherein the plurality of power generation modules comprise a plurality of first power generation modules and one or more of the plurality of actuating elements comprise a second power generation module, such that when one of the first power generation modules is actuated by the second power generation module to produce electrical power, the second power generation module is simultaneously actuated by said one of the first power generation modules to produce additional electrical power.

8. The triboelectric generator of claim 1, wherein the power generation modules are arranged to come into contact with said other surface at substantially the same time, the triboelectric generator further comprising:
   means for delaying the power output of one power generation module relative to other ones of the power generation modules, such that the electrical power generated by said one power generation module is supplied to the common output at a different time to the electrical power generated by said other ones of the power generation modules.

9. The triboelectric generator of claim 8, wherein the means for delaying the power output comprises a delay circuit,
   optionally wherein the delay circuit comprises one or more active electrical components arranged to be powered from the common output.

10. The triboelectric generator of claim 1, further comprising:
    one or more rectifiers configured to rectify an electric current generated by each of the plurality of power generation modules and supply rectified electric current to the common output.

11. The triboelectric generator of claim 1, wherein each power generation module comprises:
    first and second electrodes,
    wherein the power generation component and the first contact surface are disposed between the first and second electrodes such that the oscillation of the power generation component induces a potential difference between the first and second electrodes, and
    wherein the first and second electrodes are connected to the common output, optionally wherein the first contact surface consists of the first electrode.

12. The triboelectric generator of claim 11, comprising:
a plurality of rectifiers each connected to a respective one of the plurality of power generation modules, each rectifier comprising a first input, a second input, a positive output and a negative output,
wherein the common output comprises a positive terminal and a negative terminal, and
wherein the first electrode of one of the power generation modules is electrically connected to the first input of a respective one of the plurality of rectifiers, the second electrode of said one of the power generation modules is electrically connected to the second input of said one of the plurality of rectifiers, the positive output of said one of the plurality of rectifiers is connected to the positive terminal, and the negative output of said one of the plurality of rectifiers is connected to the negative terminal.

13. The triboelectric generator of claim 12, wherein the first contact surface comprises a triboelectric layer disposed on the first electrode, such that the power generation component repeatedly makes contact with the triboelectric layer during the oscillation of the power generation component.

14. The triboelectric generator of claim 11, wherein the power generation component is formed as a sheet of material capable of generating electrical power through the triboelectric effect, and the first and second electrodes are arranged to overlap at least part of the sheet of material.

15. The triboelectric generator of claim 1, wherein the first contact surface comprises a different material to the power generation component,
optionally wherein each power generation module further comprises a second contact surface disposed on an opposite side of the power generation component to the first contact surface, such that the power generation component alternately contacts the first and second contact surface during the oscillation of the power generation component,
optionally wherein the power generation component and the first contact surface extend away from a surface of the first body towards the one or more actuating elements, the power generation component extending further away from the first body than the first contact surface, and a separation distance between the first and second bodies is set such that during the relative movement of the first and second bodies, the one or more actuating elements contact the power generation component but not the first contact surface, and
optionally wherein the first contact surface has a higher stiffness than the power generation component.

16. The triboelectric generator of claim 1, wherein each power generation module comprises:
a first power generation part disposed on the first body;
a second power generation part disposed on the second body, the second power generation part comprising one of the one or more actuating elements; and
an electrical connection configured to electrically connect the first power generation part to the second power generation part,
wherein the first power generation part comprises the material capable of generating electrical power through the triboelectric effect, and the second power generation part comprises the other surface that is arranged to come into contact with the surface of said material.

17. The triboelectric generator of claim 16, comprising:
a plurality of rectifiers each connected to a respective one of the plurality of power generation modules, each rectifier comprising a first input, a second input, a positive output and a negative output,
wherein the common output comprises a positive terminal and a negative terminal, and
wherein the first power generation part of one of the power generation modules is electrically connected to the first input of a respective one of the plurality of rectifiers, the second power generation part of said one of the power generation modules is electrically connected to the second input of said one of the plurality of rectifiers, the positive output of said one of the plurality of rectifiers is connected to the positive terminal, and the negative output of said one of the plurality of rectifiers is connected to the negative terminal.

18. Apparatus comprising:
first and second parts arranged to move relative to one another during normal operation of the apparatus; and
a triboelectric generator according to claim 1 for harvesting electrical power from the relative movement of the first and second parts of the apparatus,
wherein the first body of the triboelectric generator comprises or is physically connected to the first part of the apparatus, and the second body of the triboelectric generator comprises or is physically connected to the second part of the apparatus.

19. The apparatus of claim 18, wherein the apparatus is configured to be worn on a human or animal body, such that movement of said human or animal body causes the first and second parts to move relative to one another,
optionally wherein the apparatus comprises an item of clothing, and
optionally wherein the first and second parts comprise layers of material arranged to slide over one another, or
wherein the apparatus comprises machinery configured to produce linear and/or rotational motion.

20. The apparatus of claim 1, wherein the power generation component has a first end that is fixed relative to the first contact surface, and has a second end that is free to move relative to the first contact surface during said oscillation of the power generation component.

21. The apparatus of claim 1, wherein the plurality of power generation modules are configured such that the plurality of power generation modules supply electrical power to the common output at different times during the relative movement of the first and second bodies.

* * * * *